United States Patent
Ihm et al.

(10) Patent No.: US 7,944,894 B2
(45) Date of Patent: *May 17, 2011

(54) PACKET TRANSMISSION IN A WIRELESS COMMUNICATION SYSTEM USING MULTIPLE ANTENNAS

(75) Inventors: Bin-Chul Ihm, Anyang-si (KR); Jin-Young Chun, Seoul (KR); Yong-Suk Jin, Anyang-si (KR)

(73) Assignee: LG Electronics Inc., Seoul (KR)

( * ) Notice: Subject to any disclaimer, the term of this patent is extended or adjusted under 35 U.S.C. 154(b) by 116 days.

This patent is subject to a terminal disclaimer.

(21) Appl. No.: 12/355,743

(22) Filed: Jan. 16, 2009

(65) Prior Publication Data

US 2009/0190543 A1 Jul. 30, 2009

Related U.S. Application Data

(63) Continuation of application No. 11/205,816, filed on Aug. 17, 2005, now Pat. No. 7,554,985.

(30) Foreign Application Priority Data

Aug. 17, 2004 (KR) .............................. 2004-0064551
Mar. 9, 2005 (KR) .............................. 2005-0019788

(51) Int. Cl.
*H04W 4/00* (2009.01)
*H04J 3/16* (2006.01)
*G06F 11/00* (2006.01)
*H04L 1/18* (2006.01)

(52) U.S. Cl. ............ 370/336; 370/465; 714/18; 714/748

(58) Field of Classification Search ................. None
See application file for complete search history.

(56) References Cited

U.S. PATENT DOCUMENTS

2003/0066004 A1* 4/2003 Rudrapatna et al. .......... 714/751
(Continued)

FOREIGN PATENT DOCUMENTS

EP 0735701 3/1996
(Continued)

OTHER PUBLICATIONS

Hammons, et al., "On the Theory of Space-time codes for PSK Modulation", IEEE Transactions on Information Theory, vol. 46, Issue 2, pp. 524-542, Mar. 2000.

*Primary Examiner* — Nittaya Juntima
(74) *Attorney, Agent, or Firm* — Lee, Hong, Degerman, Kang & Waimey

(57) ABSTRACT

A method of retransmitting packet data in a wireless communication system comprises receiving a link map information element from a transmitting station having three antennas to achieve space time transmit diversity, wherein first, second and third packet data are transmitted from first, second and third antenna of the transmitting station, respectively. The method also comprises transmitting a non-acknowledgement signal to the transmitting station if at least one packet data from the transmitting station is not properly decoded. The method also comprises receiving the packet data from the transmitting station, wherein at least two of retransmitted packet data are transmitted from different antennas of the transmitting station, and one of retransmitted packet data is transmitted from the same antenna of the transmitting station. The retransmitted packet data are received with an information element comprising a retransmission count associated with a number of retransmission made by the transmitting station.

14 Claims, 12 Drawing Sheets

U.S. PATENT DOCUMENTS

| | | | |
|---|---|---|---|
| 2003/0072285 A1* | 4/2003 | Onggosanusi et al. | 370/335 |
| 2004/0009755 A1 | 1/2004 | Yoshida | |
| 2004/0057530 A1* | 3/2004 | Tarokh et al. | 375/267 |
| 2004/0218690 A1* | 11/2004 | Jeong et al. | 375/299 |
| 2005/0101259 A1 | 5/2005 | Tong et al. | |
| 2005/0265225 A1 | 12/2005 | Mahadevappa et al. | |
| 2006/0114813 A1 | 6/2006 | Seki et al. | |
| 2007/0002892 A1 | 1/2007 | Waxman | |
| 2007/0243903 A1* | 10/2007 | Ihm et al. | 455/562.1 |
| 2009/0010227 A1* | 1/2009 | Ihm et al. | 370/334 |

FOREIGN PATENT DOCUMENTS

| | | |
|---|---|---|
| KR | 10-2002-0008301 | 1/2002 |
| KR | 10-2003-0095632 | 12/2003 |

* cited by examiner

FIG.1
Related Art (A) $\begin{bmatrix} S_{i+1} \\ S_{i+2} \end{bmatrix}$ (B) $\begin{bmatrix} S_{i+1} \\ S_{i+2} \\ S_{i+3} \\ S_{i+4} \end{bmatrix}$

FIG.2
Related Art (A) $\begin{bmatrix} -S^*_{i+2} \\ S^*_{i+1} \end{bmatrix}$ (B) $\begin{bmatrix} -S^*_{i+2} \\ S^*_{i+1} \\ -S^*_{i+4} \\ S^*_{i+3} \end{bmatrix}$

FIG. 3(A)
Related Art
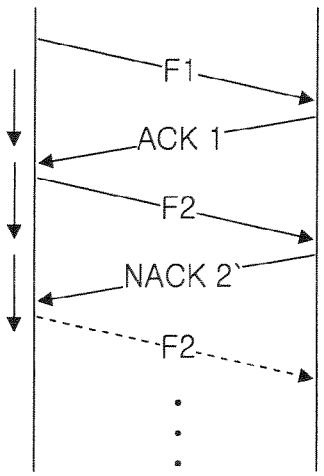
(a) Stop-and-wait
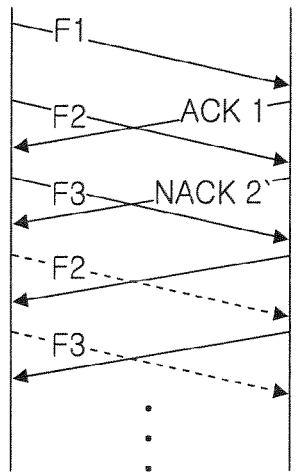
(b) Go-back-N
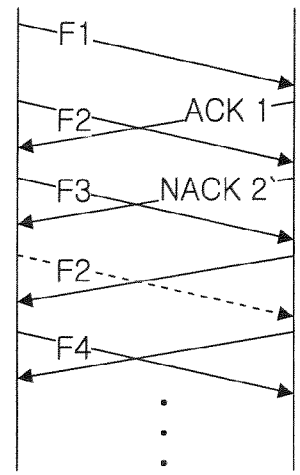
(c) Selective repeat
FIG. 3(B)
Related Art
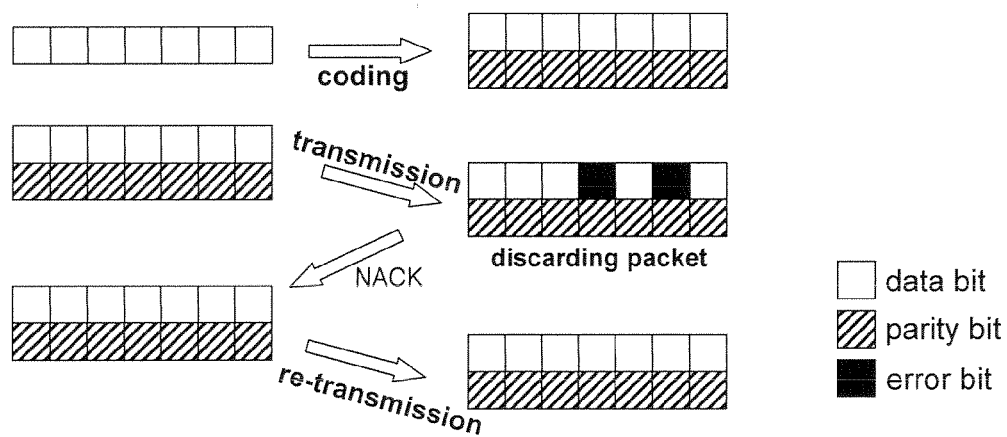
- ☐ data bit
- ▨ parity bit
- ■ error bit

FIG.4

$$\begin{bmatrix} s_{i+1} \\ s_{i+2} \\ s_{i+3} \end{bmatrix}$$

FIG.5

$$\begin{bmatrix} x_1(i) \\ x_2(i) \\ x_3(i) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} s_{i+1} \\ s_{i+2} \\ s_{i+3} \end{bmatrix} + \begin{bmatrix} v_{i+1} \\ v_{i+2} \\ v_{i+3} \end{bmatrix}$$

FIG.6

(A) $\begin{bmatrix} -s_{i+2}^* \\ s_{i+1}^* \\ s_{i+3}^* \end{bmatrix}$ (B) $\begin{bmatrix} -s_{i+2}^* \\ s_{i+1}^* \\ s_{i+4}^* \end{bmatrix}$ (C) $\begin{bmatrix} -s_{i+2}^* \\ s_{i+1}^* \\ 0 \end{bmatrix}$ (D) $\dfrac{1}{\sqrt{2}} \begin{bmatrix} -s_{i+2}^* + s_{i+3}^* \\ s_{i+1}^* + s_{i+3}^* \\ -s_{i+1}^* - s_{i+2}^* \end{bmatrix}$

FIG.7

(A)
$$\begin{bmatrix} x_1(i) \\ x_2(i) \\ x_3(i) \\ x_1(i+1) \\ x_2(i+1) \\ x_3(i+1) \end{bmatrix} = \begin{bmatrix} h_{11} & h_{12} & h_{13} \\ h_{21} & h_{22} & h_{23} \\ h_{31} & h_{32} & h_{33} \\ h_{12}^* & -h_{11}^* & h_{13}^* \\ h_{22}^* & -h_{21}^* & h_{23}^* \\ h_{32}^* & -h_{31}^* & h_{33}^* \end{bmatrix} \begin{bmatrix} s_{i+1} \\ s_{i+2} \\ s_{i+3} \end{bmatrix} + \begin{bmatrix} v_{i+1} \\ v_{i+2} \\ v_{i+3} \\ v_{i+4} \\ v_{i+5} \\ v_{i+6} \end{bmatrix}$$

(B)
$$\begin{bmatrix} x_1(i) \\ x_2(i) \\ x_3(i) \\ x_1(i+1) \\ x_2(i+1) \\ x_3(i+1) \end{bmatrix} = \begin{bmatrix} h_{11} & h_{12} & h_{13} & 0 \\ h_{21} & h_{22} & h_{23} & 0 \\ h_{31} & h_{32} & h_{33} & 0 \\ h_{12}^* & -h_{11}^* & 0 & h_{13}^* \\ h_{22}^* & -h_{21}^* & 0 & h_{23}^* \\ h_{32}^* & -h_{31}^* & 0 & h_{33}^* \end{bmatrix} \begin{bmatrix} s_{i+1} \\ s_{i+2} \\ s_{i+3} \\ s_{i+4} \end{bmatrix} + \begin{bmatrix} v_{i+1} \\ v_{i+2} \\ v_{i+3} \\ v_{i+4} \\ v_{i+5} \\ v_{i+6} \end{bmatrix}$$

(C)
$$\begin{bmatrix} x_1(i) \\ x_2(i) \\ x_3(i) \\ x_1(i+1) \\ x_2(i+1) \\ x_3(i+1) \end{bmatrix} = \begin{bmatrix} h_{11} & h_{12} & h_{13} \\ h_{21} & h_{22} & h_{23} \\ h_{31} & h_{32} & h_{33} \\ h_{12}^* & -h_{11}^* & 0 \\ h_{22}^* & -h_{21}^* & 0 \\ h_{32}^* & -h_{31}^* & 0 \end{bmatrix} \begin{bmatrix} s_{i+1} \\ s_{i+2} \\ s_{i+3} \end{bmatrix} + \begin{bmatrix} v_{i+1} \\ v_{i+2} \\ v_{i+3} \\ v_{i+4} \\ v_{i+5} \\ v_{i+6} \end{bmatrix}$$

(D)
$$\begin{bmatrix} x_1(i) \\ x_2(i) \\ x_3(i) \\ x_1(i+1) \\ x_2(i+1) \\ x_3(i+1) \end{bmatrix} = \begin{bmatrix} h_{11} & h_{12} & h_{13} \\ h_{21} & h_{22} & h_{23} \\ h_{31} & h_{32} & h_{33} \\ \dfrac{h_{12}^* - h_{13}^*}{\sqrt{2}} & \dfrac{-h_{11}^* - h_{13}^*}{\sqrt{2}} & \dfrac{h_{11}^* + h_{12}^*}{\sqrt{2}} \\ \dfrac{h_{22}^* - h_{23}^*}{\sqrt{2}} & \dfrac{-h_{21}^* - h_{23}^*}{\sqrt{2}} & \dfrac{h_{21}^* + h_{22}^*}{\sqrt{2}} \\ \dfrac{h_{32}^* - h_{33}^*}{\sqrt{2}} & \dfrac{-h_{31}^* - h_{33}^*}{\sqrt{2}} & \dfrac{h_{31}^* + h_{32}^*}{\sqrt{2}} \end{bmatrix} \begin{bmatrix} s_{i+1} \\ s_{i+2} \\ s_{i+3} \end{bmatrix} + \begin{bmatrix} v_{i+1} \\ v_{i+2} \\ v_{i+3} \\ v_{i+4} \\ v_{i+5} \\ v_{i+6} \end{bmatrix}$$

PACKET TRANSMISSION IN A WIRELESS COMMUNICATION SYSTEM USING MULTIPLE ANTENNAS

CROSS-REFERENCE TO RELATED APPLICATIONS

This is a continuation of U.S. patent application Ser. No. 11/205,816, filed on Aug. 17, 2005, now U.S. Pat. No. 7,554,985, issued on Jun. 30, 2009, which pursuant to 35 U.S.C. §119(a), claims the benefit of earlier filing date and right of priority to Korean Application No. 2004-0064551, filed on Aug. 17, 2004, and Korean Application No. 2005-0019788, filed on Mar. 9, 2005, the contents of which are hereby incorporated by reference herein in their entirety.

FIELD OF THE INVENTION

The present invention relates generally to a wireless communication system and, more particularly, to packet transmission in a wireless communication system.

BACKGROUND OF THE INVENTION

Multimedia services in wireless communication systems are in increasing demand. Developments are being made to achieve data transmissions with higher capacity and higher speed. Therefore, efficient use of limited radio frequency resources is of increasing importance. To this end, a multiple-input multiple-output (MIMO) system using a multi-antenna has been employed. The multi-antenna system uses two or four transmitting antennas to send packets.

FIGS. 1(A) and 1(B) depict mathematical representations (e.g., matrices) of an exemplary signal (e.g., packet) transmitted through two and four transmitting antennas, respectively. FIGS. 2(A) and 2(B) depict mathematical representations of an exemplary re-transmission packet transmitted through each antenna when initial transmission of the packet fails.

Referring to FIGS. 2(A) and 2(B), if an error occurs in packet transmission, the transmission system alters the packets to enable them to be transmitted through each antenna. The transmission then re-transmits the packets. Such a re-transmission method may allow SNR (signal to noise ratio) gain at a receiving side to be increased by making an initially transmitted packet and a re-transmitted packet have a STTD (space time transmit diversity) structure.

However, the conventional packet re-transmission using two or four transmitting antennas may have problems, such as waste of radio resources.

Furthermore, in the field of data transmissions, an ARQ (Automatic Repeat reQuest) method is a type of error data re-transmission method. ARQ refers to a response message that indicates whether or not a receiving station has properly received data after transmission. The ARQ response method comprises three types: a Stop-and-wait ARQ, a Go-back-N ARQ and a Selective-repeat ARQ.

FIG. 3(A) illustrates three types of ARQ methods.

Referring to FIG. 3(A), the Stop-and-wait ARQ is a method where a transmitting station transmits data and waits to receive an ACK (acknowledgement) or NACK (non-acknowledgement) message (signal) from a receiving station. Then, the transmitting station transmits new data or re-transmits the previously transmitted data. The Go-back-N ARQ is a method where data is continuously transmitted regardless of receiving a response. When a NACK signal is received, data is re-transmitted in turn starting from the data indicated by the NACK signal. The Selective-repeat ARQ is a method where data is continuously transmitted, and only the data for which a NACK signal has been received is re-transmitted.

For packet data transmissions, in order to prevent errors that may be generated in a high speed transmission environment employing a high data rate (e.g., 2 Mbps, 10 Mbps or higher), a suitable coding rate or modulation method (e.g., Rc=5/6, 3/4; Mod=16-QAM, 64QAM) has been applied to communication systems. In addition to this, an ARQ method suitable for the high-speed transmission environment, namely, a Hybrid ARQ (HARQ) method has been proposed.

In the ARQ method, when an error is generated, the corresponding information is discarded, whereas in the HARQ method, information with an error is stored in a buffer and combined with re-transmitted information and FEC (Forward Error Correction) is applied thereto. Thus, the HARQ method employs the ARQ method with FEC additionally performed (HARQ=FEC+ARQ).

The HARQ method may be divided into four types, as described below.

FIG. 3(B) shows a Type I HARQ method, by which an error detection code is added to data in order to preferentially detect an FEC. If the data (packet) still includes an error, the transmitting station is requested to re-transmit the data (packet). The packet with an error is discarded and the re-transmitted packet uses the same FEC code as that of the discarded packet.

FIG. 3(C) shows a Type II HARQ method, which is also called an IR (Incremental Redundancy) ARQ. Referring to FIG. 3, according to the Type II HARQ method, a first (initially) transmitted packet is not discarded but is stored in a buffer and then combined with re-transmitted redundancy bits. Upon re-transmission, only the parity bits (excluding the data bits) are re-transmitted. The parity bits that are re-transmitted are different for each re-transmission.

FIG. 3(D) shows a Type III HARQ method, which is a special case of the Type II HARQ method. Here, each packet is self-decodable. Re-transmissions are performed for each packet that includes data as well as portions having errors. Compared with the Type II HARQ method, the Type III HARQ method may achieve more accurate decoding, but has less coding gain.

FIG. 3(E) shows a fourth method called 'Type I with soft combining method', which combines the function of the Type I HARQ method plus a function of storing the data first (initially) received from a receiving station and combining such with re-transmitted data. The method is also referred to as 'metric combining' or 'chase combining.' The method is advantageous with respect to an Signal to Interference Plus Noise Ratio (SINR). Furthermore, the same parity bits for the re-transmitted data are used.

The MIMO system will now be described as follows. The MIMO system is a wireless system in which a terminal and a base station transmit and receive signals using one or more antennas and diversity gain may be obtained on the time axis or on the frequency axis. The MIMO system employs two types of methods: STTD (Space-Time Transmit Diversity) and Collaborative Spatial Multiplexing (SM). STTD is a method for obtaining diversity gain through use of antennas and time axis information by transmitting two or more signals via two or more antennas, while Collaborative SM is a method for allocating two or more terminals to a single radio resource.

For example, when the base station has two antennas, a MIMO matrix 'A' of equation (1) shown below may be used to transmit signals S1 and S2 according to the STTD method.

Thus, equation (1) shows a MIMO matrix of the STTD method for 2-antenna transmission.

$$A = \begin{Bmatrix} S_1 & -S_2^* \\ S_2 & S_1^* \end{Bmatrix} \quad (1)$$

In equation (1), the rows of the matrix represent the signals sequentially transmitted through the first and second antennas, while the columns of the matrix refer to a time sequence. In other words, on a first channel, the first antenna is used to transmit the signal S1 and the second antenna is used to transmit the signal S2, while on the second channel, the first antenna is used to transmit the signal $-S_2^*$ and the second antenna is used to transmit the signal $S_2$. Assuming that reception values received at the receiving end over time are r1 and r2, then r1 and r2 may be calculated by equation (2) shown below. Thus, equation (2) represents the reception signals for 2-antenna transmission:

$$r_1 = h_1 \cdot S_1 + h_2 \cdot S_2$$
$$r_2 = h_1 \cdot (-S_2^*) + h_2 \cdot S_1^* \quad (2)$$

In equation (2), h1 and h2 represent a channel state (condition or status) of the first and second antennas, respectively. In addition, when the base station has two antennas, in order to transmit the signals S1 and S2 according to the Collaborative SM method, a MIMO matrix B, such as in equation (3) shown below may be used. Thus, equation (3) shows a MIMO matrix of the Collaborative SM method:

$$B = \begin{Bmatrix} S_1 \\ S_2 \end{Bmatrix} \quad (3)$$

In a communications system using three or four transmission antennas and performing re-transmissions, when a first spatial multiplexing transmission is performed, signals represented by the vectors shown in [Table 1] and [Table 2] are transmitted and each element of each vector is transmitted via each antenna. [Table 1] shows an example of a HARQ re-transmission vector when using three antennas, while [Table 2] shows an example of a HARQ re-transmission vector when using four antennas. Note: The tables are located on pages 6 and 7.

In this embodiment, when re-transmission is required, the odd numbered re-transmissions and the even numbered re-transmissions are discriminated when performing re-transmissions. For an odd number re-transmission, a re-transmission "option" (i.e., a type of space-time code incremental redundancy for a matrix) may be selected such that one of several re-transmission vectors is selectively used for the re-transmission.

For the downlink, the information for selecting an option may be indicated by varying a codeword of a NACK signal that is received. For example, in case of ACK, the codeword "0,0,0" may be sent, while in case of NACK, "4, 7, 2" may be sent to indicate Option 1, while "1, 2, 3" may be sent to indicate Option 2, and "3, 6, 5" may be sent to indicate Option 3. In this manner, ACK and NACK may be distinguished, and in case of NACK, the particular option to be used (Option 1, 2, or 3) may be distinguished.

However, for the uplink, because the related art ACK/NACK signal is expressed as a single bit, such option selection may not be indicated by using the related art ACK/NACK signal.

TABLE 1

| | Initial transmission | Odd number re-transmission | Even number re-transmission |
|---|---|---|---|
| Space time code incremental redundancy for matrix | $S_2^{(0)} = \begin{bmatrix} S_{i+1} \\ S_{s+2} \\ S_{i+3} \end{bmatrix}$ | $S_2^{(odd)} = \begin{bmatrix} -S_{i+2}^* \\ S_{i+1}^* \\ S_{i+3}^* \end{bmatrix}$ (Option 1) | $S_2^{(even)} = \begin{bmatrix} S_{i+1} \\ S_{s+2} \\ S_{i+3} \end{bmatrix}$ |
| | | $S_2^{(odd)} = \begin{bmatrix} -S_{i+3}^* \\ S_{i+2}^* \\ S_{i+1}^* \end{bmatrix}$ (Option 2) | |
| | | $S_2^{(odd)} = \begin{bmatrix} -S_{i+1}^* \\ S_{i+3}^* \\ S_{i+2}^* \end{bmatrix}$ (Option 3) | |

TABLE 2

| | Initial transmission | Odd number re-transmission | Even number re-transmission |
|---|---|---|---|
| Space time code incremental redundancy for matrix | $S_2^{(0)} = \begin{bmatrix} S_{i+1} \\ S_{i+2} \\ S_{i+3} \\ S_{i+4} \end{bmatrix}$ | $S_2^{(odd)} = \begin{bmatrix} -S_{i+2}^* \\ S_{i+1}^* \\ -S_{i+4}^* \\ S_{i+3}^* \end{bmatrix}$ (Option 1) | $S_2^{(even)} = \begin{bmatrix} S_{i+1} \\ S_{i+2} \\ S_{i+3} \\ S_{i+4} \end{bmatrix}$ |
| | | $S_2^{(odd)} = \begin{bmatrix} -S_{i+3}^* \\ -S_{i+4}^* \\ S_{i+1}^* \\ S_{i+2}^* \end{bmatrix}$ (Option 2) | |
| | | $S_2^{(odd)} = \begin{bmatrix} -S_{i+4}^* \\ -S_{i+3}^* \\ S_{i+2}^* \\ S_{i+1}^* \end{bmatrix}$ (Option 3) | |

As stated above, the related art MIMO system has at least the following problems. When re-transmission is performed, the field indicating the 'nth' transmission is included in the Information Element (IE), but when one of several options of the NACL signal is selected to be used in sending a re-transmission vector, there is no definition or procedure that specifies whether the base station or the terminal should perform the selection and then send the re-transmission vector, and there is no definition or procedure as to how such selection should be made.

SUMMARY OF THE INVENTION

Accordingly, the present invention is directed to packet transmission in a wireless communication system that substantially obviates one or more problems due to limitations and disadvantages of the related art.

An object of the present invention is to provide for packet transmission using multiple transmitting antennas. The packet transmission may preferably be a re-transmission. The multiple transmitting antennas may preferably include three transmitting antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of retransmitting packet data in a wireless communication system comprises receiving a link map information element from a transmitting station having three antennas to achieve space time transmit diversity, wherein first, second and third packet data are transmitted from first, second and third antenna of the transmitting station, respectively. The method also comprises transmitting a non-acknowledgement signal to the transmitting station if at least one packet data from the transmitting station is not properly decoded. The method also comprises receiving the packet data from the transmitting station, wherein at least two of retransmitted packet data are transmitted from different antennas of the transmitting station, and one of retransmitted packet data is transmitted from the same antenna of the transmitting station. The retransmitted packet data are received with an information element comprising a retransmission count associated with a number of retransmission made by the transmitting station.

In the step of receiving the packet data from the transmitting station, retransmitted first packet data may be transmitted from the second antenna, retransmitted second packet data is transmitted from the first antenna, and retransmitted third packet data is transmitted from the third antenna. The non-acknowledgement signal to the transmitting station may comprise a retransmission option for informing the transmitting station, the retransmission option being associated with antenna assignment of packet data retransmission.

The method may further comprise transmitting to the transmitting station a link information element comprising a retransmission option for informing the transmitting station, the retransmission option being associated with antenna assignment of packet data retransmission. The retransmitted packet data may be conjugate of the originally transmitted packet data. One retransmitted packet data may be transmitted with a 180 degree phase shift from the originally transmitted packet data. The link map information element may comprise at least one of an uplink map information element and a downlink map information element. The originally transmitted packet data may be transmitted as follows:

$$\begin{bmatrix} S_{i+1} \\ S_{i+2} \\ S_{i+3} \end{bmatrix}$$

and retransmitted packet data are transmitted as follows:

$$\begin{bmatrix} -S_{i+2}^* \\ S_{i+1}^* \\ S_{i+3}^* \end{bmatrix}$$

In another embodiment, a method of retransmitting packet data in a wireless communication system comprises receiving a link map information element from a transmitting station having a plurality of antennas to achieve space time transmit diversity, wherein packet data are transmitted from the plurality of antennas of the transmitting station, respectively. The method also comprises transmitting a non-acknowledgement signal to the transmitting station if at least one packet data from the transmitting station is not properly decoded, wherein the non-acknowledgement signal to the transmitting station comprises a retransmission option for informing the transmitting station, the retransmission option being associated with antenna assignment of packet data retransmission The method also comprises receiving the packet data from the transmitting station, wherein at least two of retransmitted packet data are transmitted from different antennas of the transmitting station. The retransmitted packet data are received with an information element comprising a retransmission count associated with a number of retransmission made by the transmitting station.

In yet another embodiment, a method of retransmitting packet data in a wireless communication system comprises transmitting a link map information element from a transmitting station to a receiving station, wherein the transmitting station comprises three antennas to achieve space time transmit diversity, wherein first, second and third packet data are transmitted from first, second and third antenna, respectively. The method also comprises receiving a non-acknowledgement signal from the receiving station if at least one packet data is not properly decoded. The method also comprises re-transmitting the packet data to the receiving station, wherein at least two of retransmitted packet data are transmitted through different antennas of the transmitting station, and one of retransmitted packet data is transmitted through the same antenna of the transmitting station. The retransmitted packet data are sent with an information element comprising a retransmission count associated with a number of retransmission made by the transmitting station.

In still another embodiment, a method of retransmitting packet data in a wireless communication system comprises transmitting a link map information element from a transmitting station to a receiving station having a plurality of antennas to achieve space time transmit diversity, wherein packet data are transmitted from the plurality of antennas of the transmitting station, respectively. The method also comprises receiving a non-acknowledgement signal from the receiving station if at least one packet data from the transmitting station is not properly decoded, wherein the non-acknowledgement signal from the receiving station comprises a retransmission option for informing the transmitting station, the retransmission option being associated with antenna assignment of packet data retransmission. The method also comprises transmitting the packet data from the transmitting station to the receiving station, wherein at least two of retransmitted packet data are transmitted from different antennas of the transmitting station. The retransmitted packet data are received with an information element comprising a retransmission count associated with a number of retransmission made by the transmitting station.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

FIGS. 1(A) and 1(B) depict mathematical representations (e.g., matrices) of an exemplary signal (e.g., packet) transmitted through two and four transmitting antennas, respectively.

FIGS. 2(A) and 2(B) depict mathematical representations of an exemplary re-transmission packet transmitted through each antenna when initial transmission of the packet fails.

FIGS. 3(A) to 3(E) are diagrams illustrating various ARQ and HARQ methods.

FIG. 4 depicts a mathematical representation of an exemplary packet for initial transmission using three antennas.

FIG. 5 depicts a mathematical representation of reception signals in a reception system using three antennas.

FIGS. 6(A) to 6(D) depict mathematical representations of a packet for re-transmission using three antennas, according to various embodiments of the present invention.

FIGS. 7(A) to 7(D) depict mathematical representations of reception signals in a reception system where packet re-transmission according to the present invention is applied.

DETAILED DESCRIPTION OF THE PREFERRED EMBODIMENTS

Figure 3C:
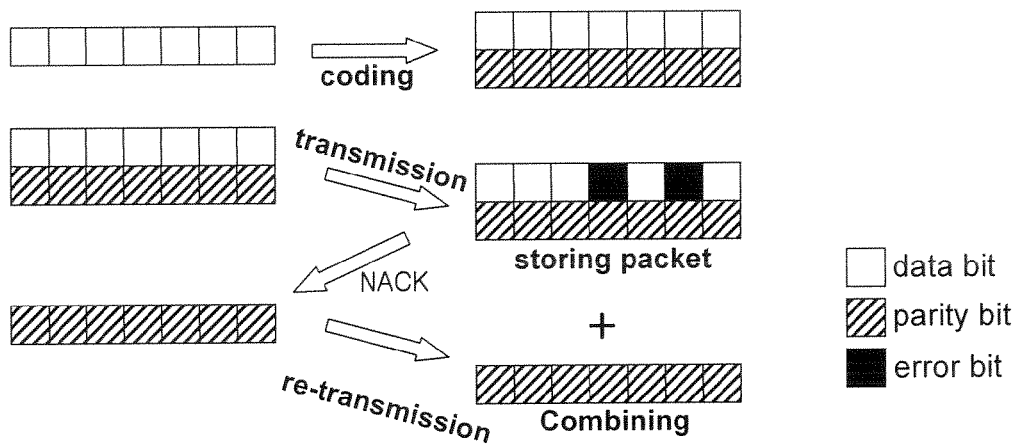
Figure 3D:
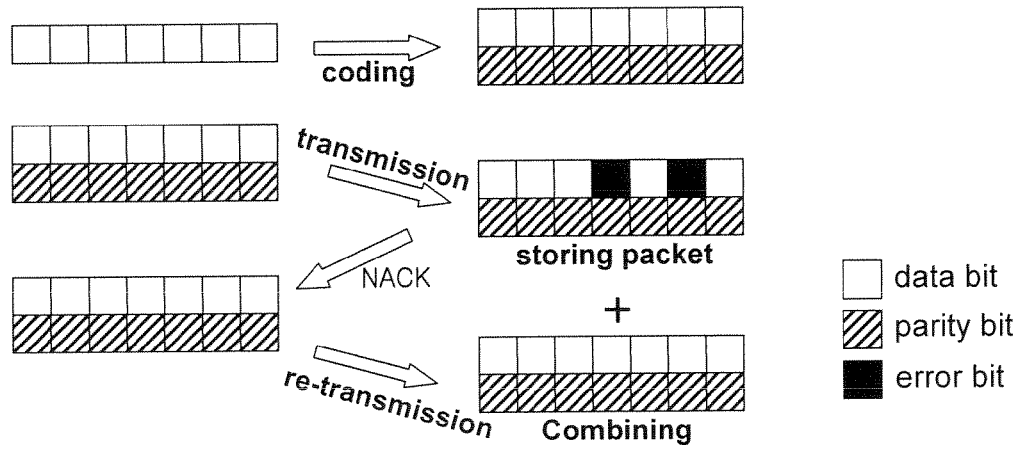
Figure 3E:
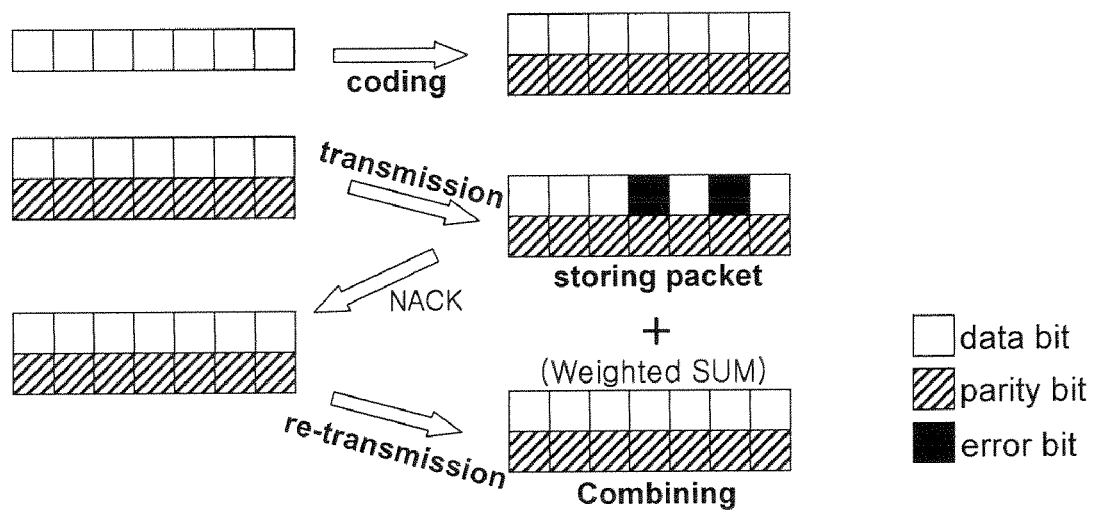

Reference will now be made in detail to the preferred embodiments of the present invention, examples of which are illustrated in the accompanying drawings. Wherever possible, the same reference numbers will be used throughout the drawings to refer to the same or like parts.

The present invention may be embodied in a wireless communications system such as the UMTS (Universal Mobile Telecommunications System) developed by the Third Generation Partnership Project (3GPP). However, the present invention may also be applied to communications systems operated using other specifications. Furthermore, the present invention may be implemented in an orthogonal frequency division multiplexing (OFDM)/orthogonal frequency division multiple access (OFDMA) system. However, the present invention may also be implemented in a wireless communication system operated according to a different standard. Additionally, the mobile station referred to herein may be a user equipment (UE) or other type of mobile station.

Packet re-transmission after a failed initial packet transmission using three transmitting antennas is described herein. To this end, construction of a re-transmission packet to be transmitted through each of the three antennas is disclosed. In the present invention, in a transmission system using three transmitting antennas, the three antennas transmit packets $si+1$, $si+2$, and $si+3$, respectively, in a first transmission.

FIG. 4 depicts a mathematical representation (matrix) of an exemplary packet (signal) for initial transmission using three antennas. Referring to FIG. 4, a reception system has at least three receiving antennas to receive packets transmitted from the transmission system.

FIG. 5 depicts a mathematical representation of reception signals in a reception system using three antennas. FIGS. 6(A) to 6(D) depict mathematical representations of a packet for re-transmission using three antennas, according to various embodiments of the present invention.

Referring to FIG. 6(A), for packet re-transmission using three antennas according to a preferred embodiment of the present invention, first and second antennas exchange previous packets and a third antenna re-transmits a different previous packet. Thus, three antennas transmit two packets. For example, the first and second antennas transmit the same packet, and the third antenna transmits a different packet.

Referring to FIGS. 6(B) and 6(C), for packet re-transmission using three antennas according to additional preferred embodiments of the present invention, the first and second antennas exchange previous packets and the third antenna re-transmits a new packet or does not transmit a packet. Thus, the first and second antennas transmit the same packet, and the third antenna transmits a different packet. More particularly, in the embodiment described with reference to FIG. 6(B), the packet initially transmitted through the third antenna is received successfully. The successful initial packet transmission using the third antenna may allow for more packets to be efficiently transmitted.

Referring to FIG. 6(D), an additional preferred embodiment of the present invention is described in which each antenna excludes its previously transmitted signal, and constructs a re-transmission packet by combining signals transmitted through other antennas. Such operation may allow a receiving end to detect packets more efficiently while each transmitting antenna has the same power.

When the reception system receives the initial packet and/or re-transmitted packets according to the above embodiments, the reception signals may be represented by the matrices depicted in FIGS. 7(A) to 7(D).

FIGS. 7(A) to 7(D) depict mathematical representations (matrices) of reception signals in a reception system where packet re-transmission according to the present invention is applied.

Referring to FIGS. 7(A) to 7(D), reception signals may be indicated as a vector, as shown in the below formula.

$$x = As + v$$

The reception system stores a transmission signal vector (s) from a reception signal vector (x) and detects a signal transmitted from the transmission system using a detection method, such as maximum likelihood, MMSE (minimum mean-squared error) and/or zero-forcing.

Although the present invention is described with reference to three antennas, the present invention may also be applied to more than four antennas. As such, the above formula may be applied to more than four receiving antennas, and the packets may be transmitted and received in a similar fashion to that described herein.

Figure 8A:
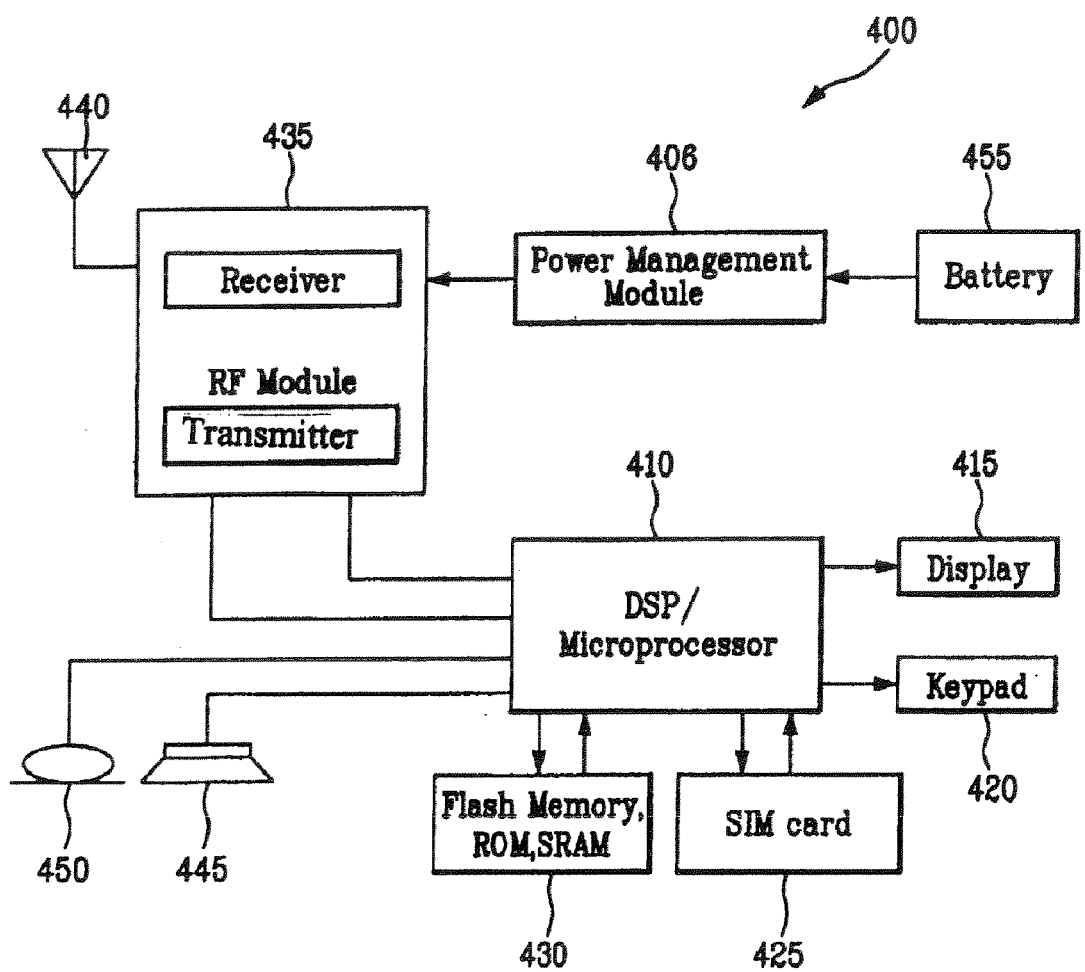
FIG. 8(A) is a block diagram illustrating an exemplary mobile station for use in conjunction with various embodiments of present invention.

FIG. 8(A) is a block diagram illustrating an exemplary mobile station for use in conjunction with various embodiments of present invention.

Referring to FIG. 8(A), a block diagram of a mobile station 400 of the present invention is illustrated, for example a mobile phone for performing the methods of the present invention. The mobile station 400 includes a processing unit 410 such as a microprocessor or digital signal processor, an RF module 435, a power management module 406, an antenna 440, a battery 455, a display 415, a keypad 420, a storage unit 430 such as flash memory, Read Only Memory (ROM) or Static Random Access Memory (SRAM), a speaker 445 and a microphone 450.

A user enters instructional information, such as a telephone number, for example, by pushing the buttons of a keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF module 435, to initiate communication, for example, transmit radio signals comprising voice communication data. The RF module 435 comprises a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 445, for example.

The processing unit 410 is adapted to store message history data of messages received from and messages transmitted to other users in the storage unit 430, receive a conditional request for message history data input by the user, process the conditional request to read message history data corresponding to the conditional request from the storage unit 430, and output the message history data to the display unit 415. The storage unit 430 is adapted to store message history data of the received messages and the transmitted messages.

Figure 8B:
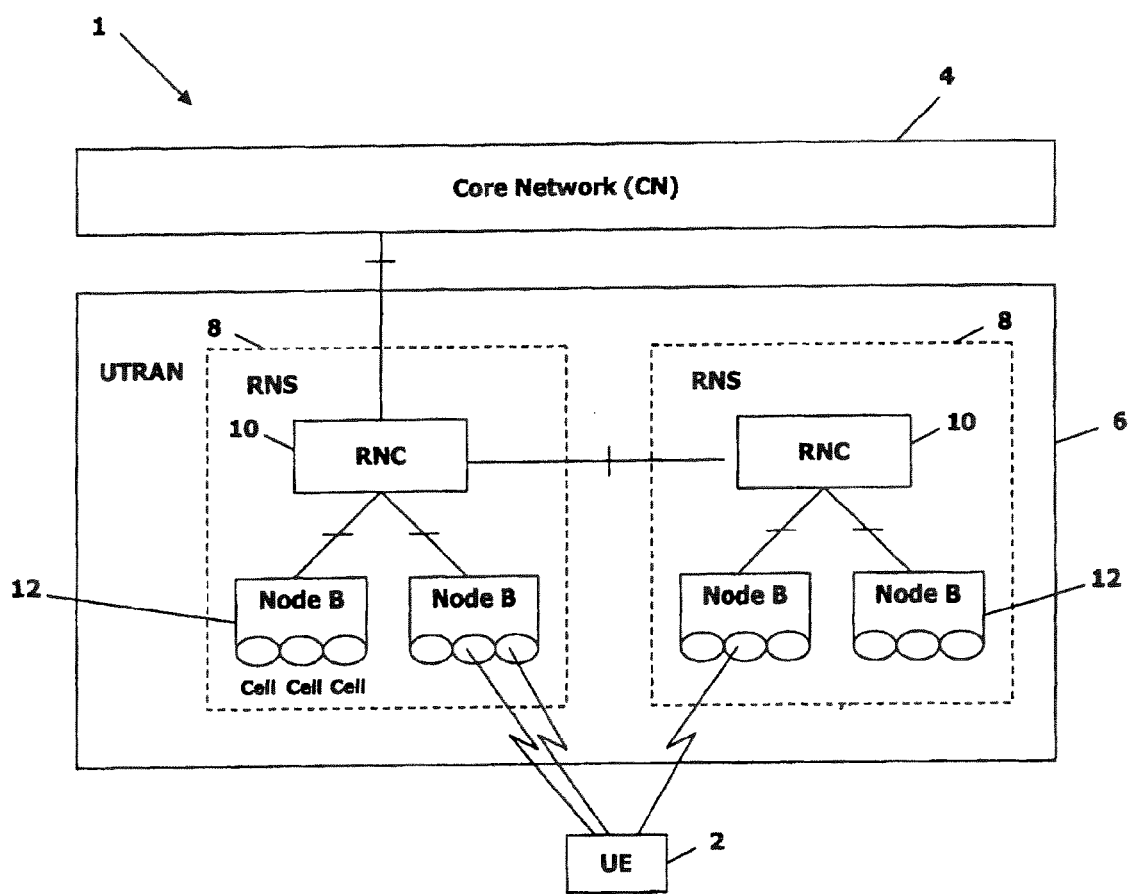
FIG. 8(B) is a block diagram illustrating an exemplary network in which various embodiments of the present invention may operate.

FIG. 8(B) is a block diagram illustrating an exemplary network 1 in which various embodiments of the present invention may operate.

Referring to FIG. 8(B), a mobile station (e.g., UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality base stations, or Node Bs 12. The RNC 10 connected to a given base station 12 is the controlling RNC for allocating and managing the common resources provided for any number of UEs 2 operating in one cell. One or more cells exist in one Node B 12. The controlling RNC 10 controls traffic load, cell congestion, and the acceptance of new radio links. Each Node B 12 may receive an uplink signal from a UE 2 and may transmit a downlink signal to the UE 2. Each Node B 12 serves as an access point enabling a UE 2 to connect to the UTRAN 6, while an RNC 10 serves as an access point for connecting the corresponding Node Bs 12 to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

In one embodiment, a method of retransmitting packet data in a wireless communication system comprises receiving a link map information element from a transmitting station having three antennas to achieve space time transmit diversity, wherein first, second and third packet data are transmitted from first, second and third antenna of the transmitting station, respectively. The method also comprises transmitting a non-acknowledgement signal to the transmitting station if at least one packet data from the transmitting station is not properly decoded. The method also comprises receiving the packet data from the transmitting station, wherein at least two of retransmitted packet data are transmitted from different antennas of the transmitting station, and one of retransmitted packet data is transmitted from the same antenna of the transmitting station. The retransmitted packet data are received with an information element comprising a retransmission count associated with a number of retransmission made by the transmitting station.

In the step of receiving the packet data from the transmitting station, retransmitted first packet data may be transmitted from the second antenna, retransmitted second packet data is transmitted from the first antenna, and retransmitted third packet data is transmitted from the third antenna. The non-acknowledgement signal to the transmitting station may comprise a retransmission option for informing the transmitting station, the retransmission option being associated with antenna assignment of packet data retransmission.

The method may further comprise transmitting to the transmitting station a link information element comprising a retransmission option for informing the transmitting station, the retransmission option being associated with antenna assignment of packet data retransmission. The retransmitted packet data may be conjugate of the originally transmitted packet data. One retransmitted packet data may be transmitted with a 180 degree phase shift from the originally transmitted packet data. The link map information element may comprise at least one of an uplink map information element and a downlink map information element. The originally transmitted packet data may be transmitted as follows:

$$\begin{bmatrix} S_{i+1} \\ S_{i+2} \\ S_{i+3} \end{bmatrix}$$

and retransmitted packet data are transmitted as follows:

$$\begin{bmatrix} -S_{i+2}^* \\ S_{i+1}^* \\ S_{i+3}^* \end{bmatrix}$$

In another embodiment, a method of retransmitting packet data in a wireless communication system comprises receiving a link map information element from a transmitting station having a plurality of antennas to achieve space time transmit diversity, wherein packet data are transmitted from the plurality of antennas of the transmitting station, respectively. The method also comprises transmitting a non-acknowledgement signal to the transmitting station if at least one packet data from the transmitting station is not properly decoded, wherein the non-acknowledgement signal to the transmitting station comprises a retransmission option for informing the transmitting station. The retransmission option is associated with antenna assignment of packet data retransmission. The method also comprises receiving the packet data from the transmitting station, wherein at least two of retransmitted packet data are transmitted from different antennas of the transmitting station. The retransmitted packet data are received with an information element comprising a retransmission count associated with a number of retransmissions made by the transmitting station.

In yet another embodiment, a method of retransmitting packet data in a wireless communication system comprises transmitting a link map information element from a transmitting station to a receiving station, wherein the transmitting station comprises three antennas to achieve space time transmit diversity, wherein first, second and third packet data are transmitted from first, second and third antenna, respectively. The method also comprises receiving a non-acknowledgement signal from the receiving station if at least one packet data is not properly decoded. The method also comprises re-transmitting the packet data to the receiving station, wherein at least two of retransmitted packet data are transmitted through different antennas of the transmitting station, and one of retransmitted packet data is transmitted through the same antenna of the transmitting station. The retransmitted packet data are sent with an information element comprising a retransmission count associated with a number of retransmissions made by the transmitting station.

In still another embodiment, a method of retransmitting packet data in a wireless communication system comprises transmitting a link map information element from a transmitting station to a receiving station having a plurality of antennas to achieve space time transmit diversity, wherein packet data are transmitted from the plurality of antennas of the transmitting station, respectively. The method also comprises receiving a non-acknowledgement signal from the receiving station if at least one packet data from the transmitting station is not properly decoded, wherein the non-acknowledgement signal from the receiving station comprises a retransmission option for informing the transmitting station. The retransmission option is associated with antenna assignment of packet data retransmission. The method also comprises transmitting the packet data from the transmitting station to the receiving station, wherein at least two of retransmitted packet data are transmitted from different antennas of the transmitting station. The retransmitted packet data are received with an information element comprising a retransmission count associated with a number of retransmission made by the transmitting station.

The present invention may provide for packet re-transmission using the three transmitting antennas. As such, the present invention may provide better performance than a re-transmission method based on a field entry condition for obtaining error probability. The present invention may be particularly suitable for low speed environments.

The transmitting station may be, for example, a base station or a mobile station. Similarly, the receiving station may be, for example, a mobile station or a base station. The various embodiments of the present invention may be applied to downlink and/or uplink transmission.

The present invention may also relate to an Information Element (IE) used for selecting a re-transmission vector. That is, the present invention relates to adding information into the IE to indicate the type of re-transmission vectors being used by the MIMO system that employs a HARQ method.

Cases of when IE information is transmitted on the uplink and on the downlink are described with reference to FIGS. 9 to 11, below.

Figure 9:
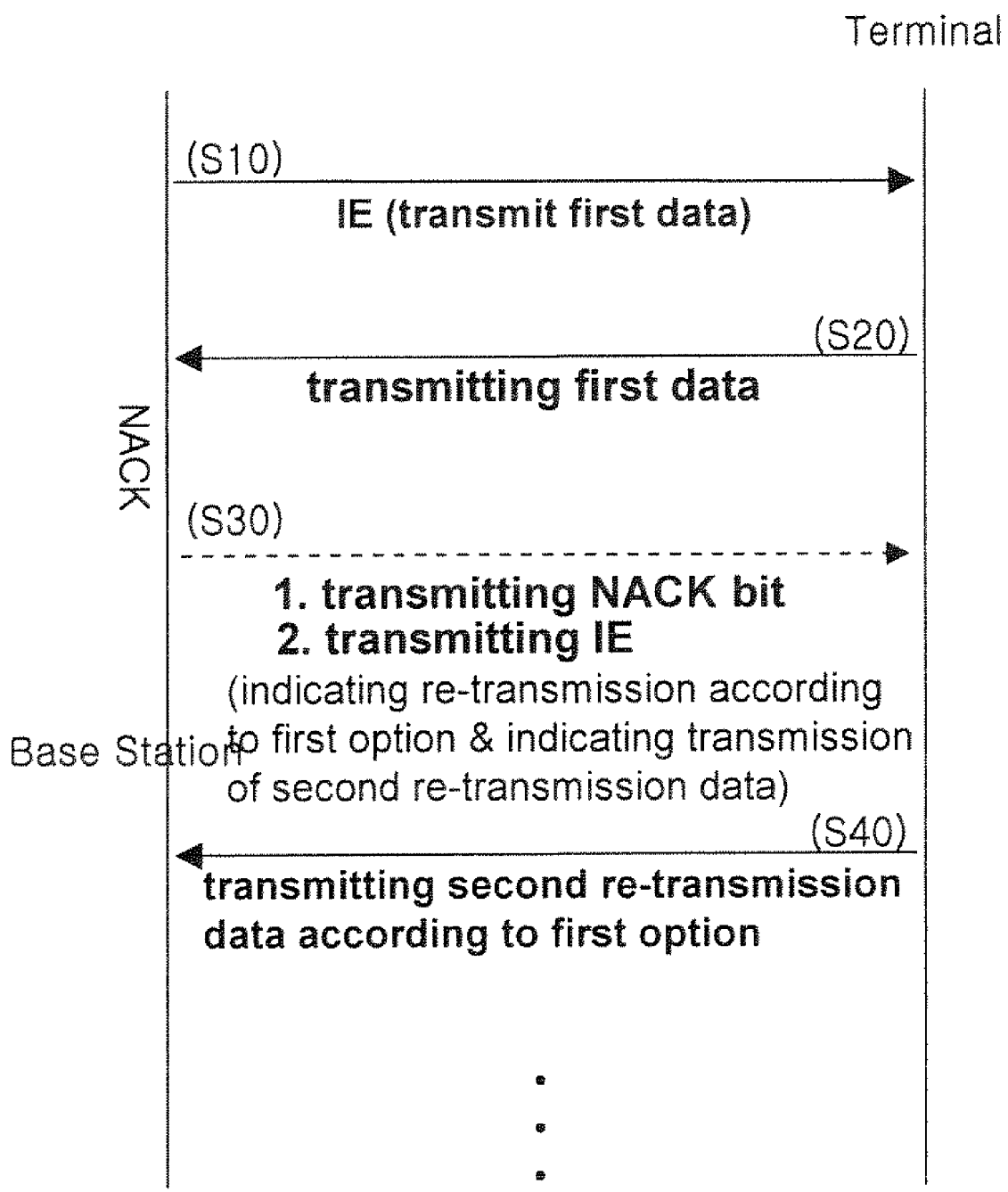
FIG. 9 is a diagram illustrating a data re-transmission procedure, according to an embodiment of the present invention.

FIG. 9 shows a data re-transmission procedure in accordance with a first embodiment of the present invention. As shown, the base station uses an Information Element (IE) to inform the terminal about data to be transmitted in order to receive a signal from the terminal (step S10). The terminal then transmits corresponding data to the base station (step S20) and the base station receives such data and determines whether the received data is an ACK or a NACK.

If the received signal is a NACK, that is, if the received data has an error, the base station transmits a NACK signal and an IE to the terminal (step S30). In such case, the base station may inform the terminal, by means of the IE, about the NACK signal by using a single bit and about which re-transmission vector is to be used. Then, the terminal performs re-transmission accordingly (step S40).

The second and third embodiments of the present invention show situations of a downlink HARQ data transmission.

Figure 10:
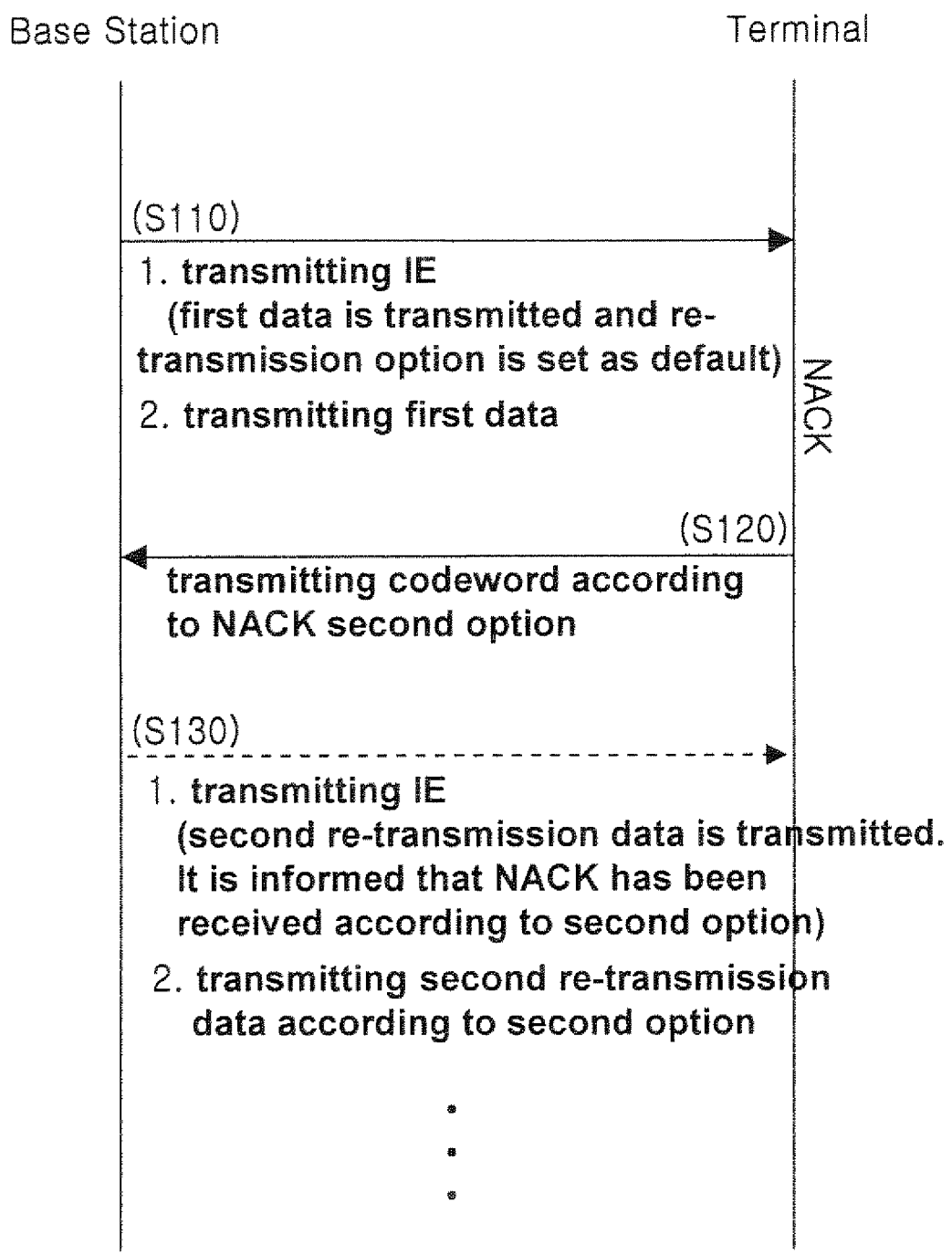
FIG. 10 is a diagram illustrating a data re-transmission procedure, according to another embodiment of the present invention.

FIG. 10 shows a data re-transmission procedure in accordance with a second embodiment of the present invention. The base station transmits first data and an IE to the terminal (step S110). Here, the IE has a default value representing a particular re-transmission option.

After the initial (first) data arrives at the terminal, if the data has an error, the terminal selects one of the re-transmission options and transmits to the base station, a NACK signal according to the selected option (step S120).

Upon receiving the NACK signal from the terminal, the base station includes the received NACK option information into the IE in order to inform the terminal about which option the NACK signal (received by the base station) belongs to, and transmits the IE (containing the received NACK option information) when sending the subsequent (second) re-transmission data. Here, the NACK option information is used to provide re-confirmation to the terminal regarding the signal that the terminal had transmitted.

Figure 11:
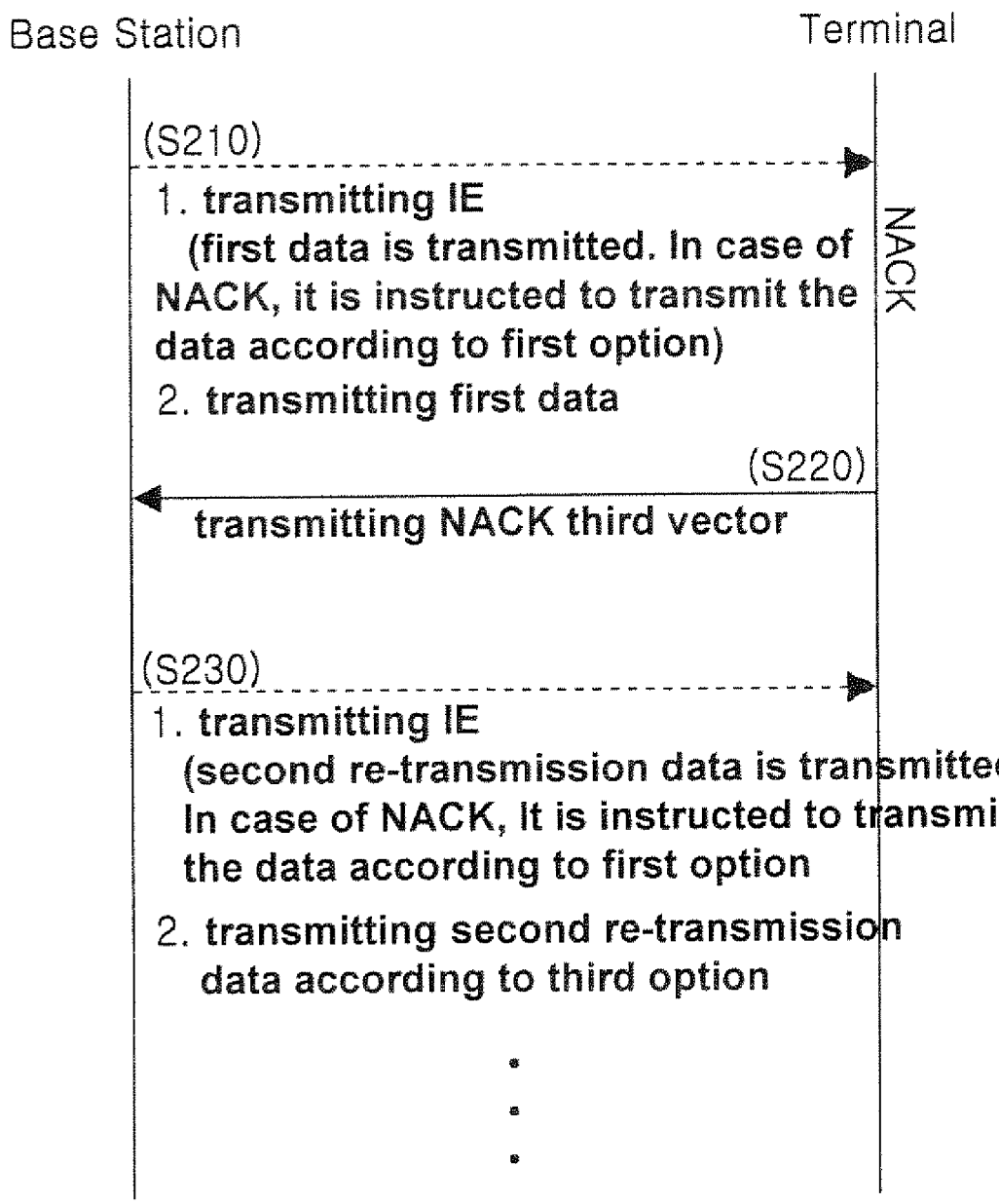
FIG. 11 is a diagram illustrating a data re-transmission procedure, according to yet another embodiment of the present invention.

FIG. 11 shows a data re-transmission procedure in accordance with a third embodiment of the present invention. The base station selects a NACK option that is to be transmitted by a terminal, and then, transmits such to the terminal (step S210). That is, the base station determines a NACK signal of a certain option to be transmitted by the terminal if the data contains an error, and adds the determined option information to the IE. The base station then transmits the IE to the terminal together with the data.

When the data from base station arrives and if such data is detected to contain an error, the terminal transmits to the base station, the NACK signal of the option that had been designated the base station (step S220). Thereafter, when different data are transmitted, the base station includes the previously determined option information in the IE and transmits it to the terminal (step S230).

The following Tables show exemplary formats of the Information Element (IE) that may be applied to various embodiments of the present invention. It should be noted that each IE according to the present invention may include a re-transmission option field.

[Table 3] shows a format of a MIMO Downlink Space-Time Code (DL STC) H-ARQ Sub-burst IE.

TABLE 3

| MIMO_DL_STC_H-ARQ_Sub-Burst_IE { | |
|---|---|
| For (j=0; j<N sub-burst; j++) { | |
| Tx count | 00: first transmission |
| | 01: second transmission |
| | 10: third transmission |
| | 11: fourth transmission |
| Retransmission Option | 00: option 1/default |
| | 01: option 2 |
| | 10: option 3 |
| | 11: reserved |

TABLE 3-continued

```
        Length
        If (Tx count == 0 ) {
            MU Indicator
            ...
        }
    }
}
```

[Table 4] shows a format of a MIMO Uplink Space-Time Code (UL STC) H-ARQ Sub-burst IE.

TABLE 4

| MIMO_UL_STC_H-ARQ_Sub-Burst_IE { | |
|---|---|
| Tx count | 00: first transmission |
| | 01: second transmission |
| | 10: third transmission |
| | 11: fourth transmission |
| Retransmission Option | 00: option 1/default |
| | 01: option 2 |
| | 10: option 3 |
| | 11: reserved |
| Duration | |
| If (Tx count == 0 ) { | |
| ... | |
| } | |
| } | |

The packet re-transmission method in accordance with the present invention may have many advantages. For example, for the uplink (UL), when there is an error in the transmission data of the terminal, the base station informs the terminal about a NACK bit and a re-transmission vector by means of an Information Element (IE), such that the terminal may select one of several re-transmission vectors and performs re-transmission accordingly.

For the downlink (DL), when the base station receives a NACK according to a specific option from the terminal, the base station provides confirmation to the terminal by means of the Information Element (IE), and thus the possibility of errors that may be generated during transmission of the NACK signal may be reduced.

In addition, in the second method for the downlink, because the terminal does not select an option of the NACK, and instead, the base station selects such option, complicated calculations that include the calculation of a channel state (condition or status) may be preferably performed by the base station, such that the burden of the terminal due to the option selection and power consumption of the terminal that would otherwise be required may be reduced.

Although the present invention is described in the context of mobile communication, the present invention may also be used in any wireless communication systems using mobile devices, such as Personal Digital Assistants (PDAs) and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, Time Division Multiple Access (TDMA), Code Division Multiple Access (CDMA), Frequency Division Multiple Access (FDMA), Wideband Code Division Multiple Access (WCDMA), etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (Compact Disc Read Only Memories (CD-ROMs), optical disks, etc.), volatile and non-volatile memory devices (e.g., Electrically Erasable Programmable Read Only Memories (EEPROMs), Read Only Memories (ROMs), Programmable Read Only Memories (PROMs), Random Access Memories (RAMs), Dynamic Random Access Memories (DRAMs), Static Random Access Memories (SRAMs), firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

In the present invention, various retransmission options may be utilized. In a first option, first and second antennas are operatively switched for retransmission. In a second option, first and third antennas are operatively switched for retransmission. In a third option, second and third antennas are operatively switched for retransmission. Alternatively, other retransmission options may be used.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of retransmitting packet data in a wireless communication system, the method comprising:

receiving a link map transmitted from a base station to a mobile station wherein the link map includes an information element for indicating retransmission option of retransmitted data from the mobile station; and re-transmitting packet data to the base station from the mobile station having three antennas to achieve space time transmit diversity, wherein first, second and third packet data are respectively transmitted from first, second and third antennas of the mobile station and the retransmitted packet data are transmitted according to one of the following mathematical representations dependent on the retransmission option:

$$\begin{bmatrix} s_{i+1} \\ s_{i+2} \\ s_{i+3} \end{bmatrix} \begin{bmatrix} -s_{i+2}^* \\ s_{i+1}^* \\ s_{i+3}^* \end{bmatrix}.$$

2. The method of claim 1, further comprising:
receiving a non-acknowledgement signal from the base station for indicating that at least one packet data is not properly received.

3. The method of claim 1, wherein the link map is a hybrid automatic repeat request uplink map (HARQ UL-MAP).

4. The method of claim 1, wherein the information element is a multiple-input multiple-output uplink space-time coding hybrid automatic repeat request sub-burst information element (MIMO UL STC HARQ sub-burst IE).

5. A method of receiving packet data in a wireless communication system, the method comprising:
transmitting a link map from a base station to a mobile station wherein the link map includes an information element for indicating retransmission option of retransmitted data from the mobile station; and
receiving retransmitted packet data from the mobile station having three antennas to achieve space time transmit diversity, wherein first, second and third packet data are respectively transmitted from first, second and third antennas of the mobile station and the retransmitted packet data are transmitted according to one of the following mathematical representations dependent on the retransmission option:

$$\begin{bmatrix} s_{i+1} \\ s_{i+2} \\ s_{i+3} \end{bmatrix} \begin{bmatrix} -s_{i+2}^* \\ s_{i+1}^* \\ s_{i+3}^* \end{bmatrix}.$$

6. The method of claim 5, further comprising;
transmitting a non-acknowledgement signal to the mobile station if at least one packet data from the transmitting station is not properly received.

7. The method of claim 5, wherein the information element is a multiple-input multiple-output uplink space-time coding hybrid automatic repeat request sub-burst information element (MIMO UL STC HARQ sub-burst IE).

8. A mobile terminal used in a wireless communication system, the mobile terminal comprising:
a receiver configured to receive a link map transmitted from a base station wherein the link map includes an information element for indicating retransmission option of retransmitted data from the mobile terminal; and
a transmitter configured to re-transmit packet data to the base station through three antennas of the mobile terminal to achieve space time transmit diversity, wherein first, second and third packet data are respectively transmitted from first, second and third antennas of the mobile terminal and the retransmitted packet data are transmitted according to one of the following mathematical representations dependent on the retransmission option:

$$\begin{bmatrix} s_{i+1} \\ s_{i+2} \\ s_{i+3} \end{bmatrix} \begin{bmatrix} -s_{i+2}^* \\ s_{i+1}^* \\ s_{i+3}^* \end{bmatrix}.$$

9. The mobile terminal of claim 8, wherein the receiver is further configured to receive a non-acknowledgement signal from the base station for indicating that at least one packet data is not properly received.

10. The mobile terminal of claim 8, wherein the link map is a hybrid automatic repeat request uplink map (HARQ UL-MAP).

11. The mobile terminal of claim 8, wherein the information element is a multiple-input multiple-output uplink space-time coding hybrid automatic repeat request sub-burst information element (MIMO UL STC HARQ sub-burst IE).

12. A base station used in a wireless communication system, the base station comprising:
a transmitter configured to transmit a link map to a mobile station wherein the link map includes an information element for indicating retransmission option of retransmitted data from the mobile station; and
a receiver configured to receive retransmitted packet data from the mobile station having three antennas to achieve space time transmit diversity, wherein first, second and third packet data are respectively transmitted from first, second and third antennas of the mobile station and the retransmitted packet data are transmitted according to one of the following mathematical representations dependent on the retransmission option:

$$\begin{bmatrix} s_{i+1} \\ s_{i+2} \\ s_{i+3} \end{bmatrix} \begin{bmatrix} -s_{i+2}^* \\ s_{i+1}^* \\ s_{i+3}^* \end{bmatrix}.$$

13. The base station of claim 12, wherein the transmitter is further configured to transmit a non-acknowledgement signal to the mobile station if at least one packet data from the mobile station is not properly received.

14. The base station of claim 12, wherein the information element is a multiple-input multiple-output uplink space-time coding hybrid automatic repeat request sub-burst information element (MIMO UL STC HARQ sub-burst IE).

\* \* \* \* \*